(12) United States Patent  (10) Patent No.: US 8,780,383 B2
Vendrow et al.  (45) Date of Patent: Jul. 15, 2014

(54) AUTHENTICATED FACSIMILE TRANSMISSION FROM MOBILE DEVICES

(75) Inventors: Vlad Vendrow, Redwood Shores, CA (US); Vladimir Shmunis, Hillsborough, CA (US)

(73) Assignee: RingCentral, Inc., San Mateo, CA (US)

( * ) Notice: Subject to any disclaimer, the term of this patent is extended or adjusted under 35 U.S.C. 154(b) by 878 days.

(21) Appl. No.: 12/469,573

(22) Filed: May 20, 2009

(65) Prior Publication Data

US 2010/0128291 A1    May 27, 2010

Related U.S. Application Data

(60) Provisional application No. 61/117,912, filed on Nov. 25, 2008.

(51) Int. Cl.
*G06F 15/00* (2006.01)
*H04M 1/66* (2006.01)

(52) U.S. Cl.
USPC ........... 358/1.15; 358/1.1; 358/1.14; 455/411

(58) Field of Classification Search
USPC .............................. 358/1.1, 1.9, 1.15; 455/411
See application file for complete search history.

(56) References Cited

U.S. PATENT DOCUMENTS

| | | | |
|---|---|---|---|
| 5,191,613 A * | 3/1993 | Graziano et al. | 713/176 |
| 5,195,131 A | 3/1993 | Sano | |
| 5,329,578 A | 7/1994 | Brennan et al. | |
| 5,530,740 A | 6/1996 | Irribarren et al. | |
| 5,712,712 A | 1/1998 | Sayward | |
| 5,717,742 A | 2/1998 | Hyde-Thomson | |
| 5,799,065 A | 8/1998 | Junqua et al. | |
| 5,889,845 A | 3/1999 | Staples et al. | |
| 5,896,448 A | 4/1999 | Holt | |
| 5,987,535 A | 11/1999 | Knodt et al. | |
| 6,038,451 A | 3/2000 | Syed et al. | |
| 6,041,110 A | 3/2000 | Lautenschlager et al. | |
| 6,104,790 A | 8/2000 | Narayanaswami | |

(Continued)

FOREIGN PATENT DOCUMENTS

| | | |
|---|---|---|
| AU | 5936296 | 5/1996 |
| CN | 200410083593 | 4/2005 |

(Continued)

OTHER PUBLICATIONS

International Preliminary Report on Patentability in Application No. PCT/US2009/051768, dated Jun. 9, 2011, 7 pages.

(Continued)

*Primary Examiner* — King Poon
*Assistant Examiner* — Iriana Cruz
(74) *Attorney, Agent, or Firm* — Fish & Richardson P.C.

(57) ABSTRACT

A fax document can be either uploaded to a fax server in a vPBX network or generated dynamically. For dynamic generation, pre-configured templates can be stored either on a mobile device or on a fax server. A user can use a mobile device connected to a vPBX network as a controlling device to direct generation of faxes on a fax server. The generation of faxes can be customized based on a geographic location of the mobile device. The generated fax can be downloaded onto a mobile device. The user can digitally sign the fax using a touch-screen input device on the mobile device. The digitally signed fax can be transmitted to a destination device.

23 Claims, 8 Drawing Sheets

(56) References Cited

U.S. PATENT DOCUMENTS

| | | |
|---|---|---|
| 6,230,024 B1 | 5/2001 | Wang et al. |
| 6,377,950 B1 | 4/2002 | Peters et al. |
| 6,442,404 B1 | 8/2002 | Sakajiri |
| 6,542,475 B1 | 4/2003 | Bala et al. |
| 6,584,093 B1 | 6/2003 | Salama et al. |
| 6,587,555 B1 | 7/2003 | Cripe et al. |
| 6,760,324 B1 | 7/2004 | Scott et al. |
| 6,792,085 B1 | 9/2004 | Rigaldies et al. |
| 6,801,341 B1 | 10/2004 | Joffe et al. |
| 6,801,520 B2 | 10/2004 | Philonenko |
| 6,801,819 B1 | 10/2004 | Barto et al. |
| 6,816,483 B1 | 11/2004 | Beckstrom et al. |
| 6,870,910 B1 | 3/2005 | Armstrong et al. |
| 6,879,676 B1 | 4/2005 | Contractor |
| 6,901,139 B2 | 5/2005 | Gonzalez et al. |
| 6,950,507 B1 | 9/2005 | Kaplan |
| 6,967,947 B1 | 11/2005 | Chen et al. |
| 6,987,840 B1 | 1/2006 | Bosik et al. |
| 6,993,360 B2 | 1/2006 | Plahte et al. |
| 6,993,561 B2 | 1/2006 | Lincke et al. |
| 6,999,469 B1 | 2/2006 | Chu et al. |
| 7,006,614 B2 | 2/2006 | Feinberg et al. |
| 7,024,457 B1 | 4/2006 | Newman et al. |
| 7,024,474 B2 | 4/2006 | Clubb et al. |
| 7,031,437 B1 | 4/2006 | Parsons et al. |
| 7,047,525 B2 | 5/2006 | Prunty et al. |
| 7,068,763 B2 | 6/2006 | Burrell et al. |
| 7,076,558 B1 | 7/2006 | Dunn |
| 7,110,523 B2 | 9/2006 | Gagle et al. |
| 7,123,608 B1 | 10/2006 | Scott et al. |
| 7,162,020 B1 | 1/2007 | Forte |
| 7,180,638 B1 | 2/2007 | Hou et al. |
| 7,184,527 B1 | 2/2007 | Lin et al. |
| 7,245,913 B1 | 7/2007 | Nguyen et al. |
| 7,254,643 B1 | 8/2007 | Peters et al. |
| 7,274,684 B2 | 9/2007 | Young et al. |
| 7,298,833 B2 | 11/2007 | Klein et al. |
| 7,308,255 B2 | 12/2007 | Loveland |
| 7,324,635 B2 | 1/2008 | Wood et al. |
| 7,333,820 B2 | 2/2008 | Sheha et al. |
| 7,359,368 B1 | 4/2008 | Pearce |
| 7,369,648 B1 | 5/2008 | Chang |
| 7,426,218 B1 | 9/2008 | Archer et al. |
| 7,480,714 B2 | 1/2009 | Wakabayashi |
| 7,640,293 B2 | 12/2009 | Wilson et al. |
| 7,702,669 B2 | 4/2010 | Vendrow et al. |
| 7,734,294 B2 | 6/2010 | Kent et al. |
| 7,783,735 B1 * | 8/2010 | Sebes et al. ................ 709/223 |
| 7,822,186 B1 | 10/2010 | Boni |
| 7,996,036 B1 | 8/2011 | Chen et al. |
| 8,000,454 B1 | 8/2011 | Or-Bach et al. |
| 8,020,486 B2 | 9/2011 | Yamamoto et al. |
| 8,457,113 B2 | 6/2013 | Wood et al. |
| 2002/0064149 A1 | 5/2002 | Elliot et al. |
| 2002/0067714 A1 | 6/2002 | Crain et al. |
| 2002/0080025 A1 | 6/2002 | Beattie |
| 2002/0085701 A1 | 7/2002 | Parsons et al. |
| 2002/0120697 A1 | 8/2002 | Generous et al. |
| 2002/0120699 A1 | 8/2002 | Wakabayashi |
| 2002/0122547 A1 | 9/2002 | Hinchey et al. |
| 2003/0007625 A1 | 1/2003 | Pines et al. |
| 2003/0008612 A1 | 1/2003 | Andreason |
| 2003/0017860 A1 | 1/2003 | Choi |
| 2003/0095541 A1 | 5/2003 | Chang et al. |
| 2003/0186686 A1 | 10/2003 | Yang et al. |
| 2004/0005042 A1 | 1/2004 | Dhara et al. |
| 2004/0028208 A1 | 2/2004 | Camazza et al. |
| 2004/0111305 A1 | 6/2004 | Gavan et al. |
| 2004/0120479 A1 | 6/2004 | Creamer et al. |
| 2004/0121814 A1 | 6/2004 | Creamer et al. |
| 2004/0146050 A1 | 7/2004 | Burrell et al. |
| 2004/0160951 A1 | 8/2004 | Galvin et al. |
| 2004/0193543 A1 * | 9/2004 | Nord et al. .................. 705/50 |
| 2004/0202300 A1 | 10/2004 | Cooper et al. |
| 2004/0203918 A1 | 10/2004 | Moriguchi et al. |
| 2004/0204038 A1 | 10/2004 | Suzuki et al. |
| 2004/0218748 A1 | 11/2004 | Fisher |
| 2004/0229620 A1 | 11/2004 | Zhao et al. |
| 2005/0047373 A1 | 3/2005 | Kojima |
| 2005/0047579 A1 | 3/2005 | Salame |
| 2005/0083915 A1 | 4/2005 | Mathew et al. |
| 2005/0088686 A1 | 4/2005 | Tanimoto |
| 2005/0117733 A1 | 6/2005 | Widger et al. |
| 2005/0141479 A1 | 6/2005 | Ozugur et al. |
| 2005/0153739 A1 | 7/2005 | Halsell |
| 2005/0180551 A1 | 8/2005 | Meek et al. |
| 2005/0195802 A1 | 9/2005 | Klein et al. |
| 2005/0207556 A1 | 9/2005 | Gonzalez et al. |
| 2005/0226473 A1 * | 10/2005 | Ramesh ................ 382/119 |
| 2006/0008066 A1 | 1/2006 | Starling et al. |
| 2006/0018454 A1 | 1/2006 | Nonaka et al. |
| 2006/0023657 A1 | 2/2006 | Woodson et al. |
| 2006/0030357 A1 | 2/2006 | McConnell et al. |
| 2006/0085516 A1 | 4/2006 | Farr et al. |
| 2006/0099931 A1 | 5/2006 | Trujilo |
| 2006/0116127 A1 | 6/2006 | Wilhoite et al. |
| 2006/0126806 A1 | 6/2006 | Trandal et al. |
| 2006/0135202 A1 * | 6/2006 | Ho et al. ................ 455/556.2 |
| 2006/0160566 A1 | 7/2006 | Plahte et al. |
| 2006/0161435 A1 | 7/2006 | Atef et al. |
| 2006/0205436 A1 | 9/2006 | Liu et al. |
| 2006/0210050 A1 | 9/2006 | Bartfeld et al. |
| 2006/0215543 A1 | 9/2006 | Croak et al. |
| 2006/0253895 A1 | 11/2006 | Brandofino et al. |
| 2007/0022213 A1 | 1/2007 | Fahmy et al. |
| 2007/0047534 A1 | 3/2007 | Hakusui |
| 2007/0058637 A1 | 3/2007 | Lo |
| 2007/0060137 A1 | 3/2007 | Yeatts et al. |
| 2007/0070976 A1 | 3/2007 | Mussman et al. |
| 2007/0105531 A1 | 5/2007 | Schroeder, Jr. |
| 2007/0111716 A1 | 5/2007 | Leigh et al. |
| 2007/0115498 A1 | 5/2007 | Noel et al. |
| 2007/0115978 A1 | 5/2007 | Kondo |
| 2007/0173237 A1 | 7/2007 | Roundtree |
| 2007/0198677 A1 | 8/2007 | Ozhan et al. |
| 2007/0236749 A1 | 10/2007 | Henry et al. |
| 2007/0253545 A1 | 11/2007 | Chatterjee et al. |
| 2007/0266077 A1 | 11/2007 | Wengrovitz |
| 2008/0002820 A1 | 1/2008 | Shtiegman et al. |
| 2008/0032704 A1 | 2/2008 | O'Neil et al. |
| 2008/0032716 A1 | 2/2008 | Forte |
| 2008/0037763 A1 | 2/2008 | Shaffer |
| 2008/0043976 A1 | 2/2008 | Maximo et al. |
| 2008/0056234 A1 | 3/2008 | Sprague |
| 2008/0075261 A1 | 3/2008 | Ramanathan et al. |
| 2008/0144804 A1 | 6/2008 | Mergen |
| 2008/0186929 A1 | 8/2008 | Rice et al. |
| 2008/0240376 A1 | 10/2008 | Conway et al. |
| 2008/0279362 A1 | 11/2008 | Yasrebi et al. |
| 2008/0298567 A1 | 12/2008 | Guile |
| 2009/0015876 A1 | 1/2009 | Brown |
| 2009/0029724 A1 | 1/2009 | Hardy et al. |
| 2009/0054032 A1 | 2/2009 | Ren et al. |
| 2009/0059818 A1 | 3/2009 | Pickett |
| 2009/0080029 A1 | 3/2009 | Vendrow et al. |
| 2009/0086278 A1 | 4/2009 | Vendrow et al. |
| 2009/0086947 A1 | 4/2009 | Vendrow |
| 2009/0086950 A1 | 4/2009 | Vendrow et al. |
| 2009/0097632 A1 | 4/2009 | Carnazza et al. |
| 2009/0116466 A1 | 5/2009 | Lee et al. |
| 2009/0116471 A1 * | 5/2009 | Guichard et al. ............ 370/350 |
| 2009/0154591 A1 | 6/2009 | Rios et al. |
| 2009/0154678 A1 | 6/2009 | Kewin et al. |
| 2009/0202050 A1 | 8/2009 | Berger et al. |
| 2009/0296907 A1 | 12/2009 | Vendrow et al. |
| 2009/0310598 A1 | 12/2009 | Winbladh et al. |
| 2010/0002626 A1 | 1/2010 | Schmidt et al. |
| 2010/0029272 A1 | 2/2010 | McCann et al. |
| 2010/0035594 A1 | 2/2010 | Vendrow et al. |
| 2010/0039676 A1 | 2/2010 | Noel et al. |
| 2010/0039677 A1 | 2/2010 | Noel et al. |
| 2010/0039678 A1 | 2/2010 | Noel et al. |
| 2010/0039679 A1 | 2/2010 | Noel et al. |
| 2010/0046037 A1 | 2/2010 | Noel et al. |

(56) References Cited

U.S. PATENT DOCUMENTS

| | | |
|---|---|---|
| 2010/0046731 A1 | 2/2010 | Gisby et al. |
| 2010/0080214 A1 | 4/2010 | Li et al. |
| 2010/0081380 A1 | 4/2010 | Lim et al. |
| 2010/0099390 A1 | 4/2010 | Vendrow et al. |
| 2010/0113013 A1 | 5/2010 | Karabinis et al. |
| 2010/0128291 A1 | 5/2010 | Vendrow et al. |
| 2010/0128861 A1 | 5/2010 | Vendrow et al. |
| 2010/0128862 A1 | 5/2010 | Vendrow |
| 2010/0128867 A1 | 5/2010 | Vendrow et al. |
| 2010/0130172 A1 | 5/2010 | Vendrow et al. |
| 2010/0130213 A1 | 5/2010 | Vendrow et al. |
| 2010/0130228 A1 | 5/2010 | Vendrow et al. |
| 2010/0183134 A1 | 7/2010 | Vendrow et al. |
| 2010/0184408 A1 | 7/2010 | Vendrow et al. |
| 2010/0185584 A1 | 7/2010 | Vendrow et al. |
| 2011/0053643 A1 | 3/2011 | Shmunis |
| 2011/0110511 A1 | 5/2011 | Vendrow et al. |
| 2011/0130168 A1 | 6/2011 | Vendrow et al. |
| 2011/0153668 A1 | 6/2011 | Walker et al. |
| 2011/0177797 A1 | 7/2011 | Vendrow et al. |
| 2011/0191441 A1 | 8/2011 | Herriman et al. |
| 2011/0238510 A1* | 9/2011 | Rowen et al. .................. 705/16 |
| 2011/0293083 A1 | 12/2011 | Larson et al. |
| 2013/0057925 A1 | 3/2013 | Shmunis et al. |

FOREIGN PATENT DOCUMENTS

| | | |
|---|---|---|
| CN | 101809986 | 8/2010 |
| EP | 0954193 | 11/1999 |
| EP | 2193655 A1 | 6/2010 |
| JP | 64-054889 | 3/1989 |
| JP | 11-251893 | 9/1999 |
| JP | 2002-314642 | 10/2002 |
| JP | 2007-006288 | 1/2007 |
| KR | 10-2000-0023675 | 4/2000 |
| KR | 10-2001-0011139 | 2/2001 |
| KR | 2001/0077413 | 8/2001 |
| KR | 10-2002-0086695 | 11/2002 |
| KR | 10-2004-0039569 | 5/2004 |
| KR | 10-2005-0014088 | 2/2005 |
| KR | 10-2005-0000884 | 6/2005 |
| KR | 10-2005-0061255 | 6/2005 |
| KR | 10-2005-0116096 | 12/2005 |
| KR | 10-2006-0018155 | 2/2006 |
| KR | 10-2006-0096568 | 9/2006 |
| KR | 10-2006-0115833 | 11/2006 |
| KR | 10-2007-0006314 | 1/2007 |
| KR | 100815239 | 3/2008 |
| KR | 10-2008-0029682 | 4/2008 |
| KR | 10-2009-0058808 | 6/2009 |
| KR | 10-2010-0065221 | 6/2010 |
| WO | 95/11578 | 4/1995 |
| WO | 96/38975 | 12/1996 |
| WO | 98/23080 | 5/1998 |
| WO | 98/27754 | 6/1998 |
| WO | 98/34391 | 8/1998 |
| WO | 98/47295 | 10/1998 |
| WO | 98/47298 | 10/1998 |
| WO | 2004/025950 | 3/2004 |
| WO | 2006/022421 | 3/2006 |
| WO | 2006/056983 | 6/2006 |
| WO | 2007/025950 | 3/2007 |
| WO | 2007/053420 | 5/2007 |
| WO | 2008/074122 | 6/2008 |
| WO | 2009/042701 | 4/2009 |
| WO | 2010/059756 | 5/2010 |
| WO | 2010/062981 | 6/2010 |
| WO | 2010/065168 | 6/2010 |

OTHER PUBLICATIONS

International Search Report & Written Opinion in Application No. PCT/US2009/051768, dated Feb. 25, 2010.

U.S. Appl. No. 11/973,309, filed Oct. 5, 2007, Shmunis et al.

"Automated Phone Trees: Two Potential Solutions," [online] Jul. 5, 2009; Retrieved from the Internet URL: http://developmentality.wordpress.com/2009107/05/automated-p hone-trees-two-potential-solutions/; 3 pages.

"California Inventors Develop Caller Identification Based Call Routing Feature," US Fed News Service, Including US State News, Jan. 29, 2008, p. 1-2.

"Call Routing Rules," IBM Lotis Sametime Unified Telephony Administrator's Guide, IBM Corp., 2009, p. 177; see also, Call Routing Rules <http://publib.boulder.ibm.com/infocenterlsametime!v8rO/index.jsp?topic=/com.ibm.help.sametime.telephony.doclsut_adm_monitor_rules_c.html>.

"Remote access RADIUS attributes: Remote Access," Microsoft Technet, Microsoft Corporation, <http://technet.microsoft. com/en-usllibrary/cc728366(WS. 1O ).aspx> (last updated Jan. 21, 2005).

Asterisk I. T.: "Asterfax—Asterisk Fax," Aug. 25, 2007, XP002598206 Retrieved from the Internet URL: http://web.archive.org/web/20070825233700/http:llasterfax.sourceforge.netlindex. html [retrived on Aug. 24, 2010].

Cho, Gihwan et al. "An Efficient Location and Routing Scheme for Mobile Computing Environments," IEEE Journal on Selected Areas in Communications, Jun. 1995, pp. 1-11, vol. 13, Issue 5.

Derek Lam, Jan Jannink, Donald C, Cox, Jennifer Widom, "Modeling Location Management in Personal Communication Services," Oct. 18, 1995, pp. 1-27, IEEE International Conference on Universial Personal Communications, 1996.

Derek Lam, Jan Jannink, Donald C. Cox, Jennifer Widom, "Teletraffic Modeling for Personal Communication Services," IEEE Communications Magazine, Feb. 1997, pp. 1-9, Stanford University.

G. Konstantoulakis, M. Sloman, "Call Management Policy Specification for the Asterisk Telephone Private Branch Exchange," IEEE Workshop on Policies for Distributed Systems and Networks (policy 2007), Jun. 13, 2007, pp. 1-11, Bologna, Italy.

Helen J. Wang, Bhaskaran Raman, Chen-Nee Chuah, Rahul Biswas, Ramakrishna Gummadi, Barbara Hohlt, Xia Hong, Emre Kiciman, Zhuoqing Mao, Jimmy S. Shih, Lakshminarayanan Subramanian, Ben Y. Zhao, Anthony D. Joseph, Randy H. Katz, "Iceberg: An Internet-core Network Architecture for Integrated Communication," pp. 1-13, IEEE Personal Communications, vol. 7, Issue 4 (Aug. 2000).

Kunwadee Sripanidkulchai, Zon-Yin Shae< Debanjan Saha, "Call Routing Management in Enterprise VoIP Networks," INM '07, Aug. 27-31, 2001, ACM SIGCOMM Workshop, pp. 1-6, Kyoto, Japan.

Marcin Kaluza: "Fax Services: Send Any Printable File From Your Program in Window 2000" MSDN Magazine, Aug. 31, 2001, XP002598207 Retrieved from the Internet: URL: http://msdn.microsoft.com/en-us/ magazine/cc301661.aspx [retrived on Aug. 24, 2010].

Mariane L'Ecuyer, "Using Skills-based Routing to Enhance Contact Center Revenue and Performance. (Call Center/CRM Management Scope)," The Free Library (May 1, 2003) <http://www.thefreelibrary.com/Using+skills-based+routing+to+enhance+contact+center+revenue+and ... -a0102137613>.

Matthew Mintz-Habib, Anshuman Rawat, Henning Schulzrinne, Xiaotao Wu, "A VoIP Emergency Services Architecture and Prototype," Computer Communications and Networks, Issue date Oct. 17-19, 2005, pp. 1-6, Columbia University.

Petros Maniatis, Mema Roussopoulos, Ed Swierk, Kevin Lai, Guido Appenzeller, Xinhua Zhao, Mary Baker, "The Mobile People Architecture," ACM Sigmobile Mobile Computing and Communications Review, vol. 3, Issue 3 (Jul. 1999), pp. 36-42; see also, <http://portal.acm.org/citation.cfm?id=329153>.

S. Lynne Stokes, Betsy S. Greenberg, "A Priority System to Improve Callback Success in Telephone Surveys," Proceedings of the Survey Research Methods Section American Statistical Association, 1990, pp. 742-747, University of Texas at Austin, Austin, Texas.

Chinese First Office Action in Patent Application No. 200880108295.7 dated Mar. 20, 2012.

US Final Office Action mailed Jul. 25, 2012, issued in U.S. Appl. No. 11/973,309.

US Final Office Action mailed Oct. 18, 2012, issued in U.S. Appl. No. 12/234,598.

(56) References Cited

OTHER PUBLICATIONS

US Final Office Action mailed Oct. 30, 2012, issued in U.S. Appl. No. 12/234,600.
US Office Action mailed Aug. 5, 2011, issued in U.S. Appl. No. 11/973,309.
US Office Action mailed Dec. 12, 2012, issued in U.S. Appl. No. 12/234,598.
US Office Action mailed Dec. 13, 2011, issued in U.S. Appl. No. 12/469,573.
US Office Action mailed Dec. 8, 2011, issued in U.S. Appl. No. 12/789,353.
US Office Action mailed Feb. 15, 2012, issued in U.S. Appl. No. 12/234,598.
US Office Action mailed Feb. 22, 2012, issued in U.S. Appl. No. 12/234,600.
US Office Action mailed Feb. 24, 2012, issued in U.S. Appl. No. 12/789,353.
US Office Action mailed Oct. 11, 2012, issued in U.S. Appl. No. 12/469,573.
US Office Action mailed Feb. 15, 2013, issued in U.S. Appl. No. 12/234,600.
European Search Report in European Patent Application No. 08833690.4-1522/2193655, dated Sep. 9, 2010.
European Office Action in European Patent Application No. 08833690.4-1522/2193655, dated Apr. 21, 2011.
European Search Report in European Patent Application No. 08835856.9-2414/2193654, dated Jan. 30, 2012.
Baharlou, Simin; Notification Concerning Transmittal of International Preliminary Report on Patentability (Chapter 1 of the Patent CooperationTreaty); International Application No. PCT/US2009/065969; Date of Mailing Jun. 9, 2011; Form PCT/IB/326 (1 page); Form PCT/IB/373 (1 page); Form PCTIISA/237 (4 pages).
Commissioner; Notification of Transmittal of the International Search Report and the Written Opinion of the International Searching Authority, or the Declaration; International Application No. PCT/US2009/065969; Date of Mailing May 28, 2010; Form PCT/ISA/220 (4 pages); Form PCT/ISAl210 (3 pages); Form PCT/ISAl237 (4 pages).
Commissioner; Notification of Transmittal of the International Search Report and the Written Opinion of the International Searching Authority, or the Declaration; International Application No. PCT/US2009/065036; Date of Mailing Jul. 9, 2010; Form PCT/ISA/220 (2 pages); Form PCTIISA/210 (3 pages); Form PCTIISAl237 (5 pages).
Copenheaver, Blaine R.; Notification of Transmittal of the International Search Report and the Written Opinion of the International Searching Authority, or the Declaration, PCT/US2009/045703, Jul. 29, 2009, Form PCTIISAl220 (3 pages), PTOIISA/210 (2 pages).
Copenheaver, Blaine R.; Notification of the Transmittal of the International Search report and Written Opinion of the International Searching Authority, or the Declaration; International Application No. PCT/US2008/077546; Date of Mailing Dec. 8, 2008; Form PCTIISAl220 (1 Page); Form PCT/ISAl210 (2 pages); Form PCTIISAl237 (5 pages).
Copenheaver, Blaine R.; Notification of the Transmittal of the International Search report and Written Opinion of the International Searching Authority, or the Declaration; International Application No. PCT/US2008/077683; Date of Mailing Dec. 10, 2008; Form PCT/ISA/220 (1 Page); Form PCT/ISA/21 0 (2 pages); Form PCT/ISA/237 (6 pages).
International Initial Publication with ISR in International Application No. PCT/US2008/077683, dated Apr. 9, 2009.
International Preliminary Report on Patentability in Application No. PCT/US2009/051751, dated Apr. 26, 2011.
International Preliminary Report on Patentability in International Application No. PCT/US2009/065976, dated May 31, 2011.
International Preliminary Report on Patentability in International Application No. PCT/US2009/065038, dated May 24, 2011.
International Preliminary Report on Patentability in International Application No. PCT/US2009/051768, dated May 31, 2011.
International Preliminary Report on Patentability in International Application No. PCT/US2009/065985, dated May 31, 2011.
International Preliminary Report on Patentability in International Application No. PCT/US2009/065055, dated May 24, 2011.
International Preliminary Report on Patentability in International Application No. PCT/US2009/065987, dated May 31, 2011.
International Preliminary Report on Patentability in International Application No. PCT/US2009/051598, dated Feb. 8, 2011.
International Preliminary Report on Patentability in International Application No. PCT/US2010/044196, dated Mar. 6, 2012.
International Preliminary Report on Patentability in International Application No. PCT/US2008/077683, dated Mar. 30, 2010.
International Preliminary Report on Patentability in International Application No. PCT/US2008/077546, dated Mar. 30, 2010.
International Search report and Written Opinion in International Application No. PCT/US2009/051751, dated Mar. 5, 2010.
International Search Report in International Application No. PCT/US2010/052880, dated Jun. 30, 2011.
International Search Report in International Application No. PCT/US2009/065976, dated Jul. 2, 2010.
International Search Report in International Application No. PCT/US2009/065038, dated Jul. 2, 2010.
International Search Report in International Application No. PCT/US2009/051768, dated Jun. 10, 2010.
International Search Report in International Application No. PCT/US2009/065985, dated Jun. 22, 2010.
International Search Report in International Application No. PCT/US2009/065055, dated Jul. 7, 2010.
International Search Report in International Application No. PCT/US2009/065987, dated Jul. 14, 2010.
International Search Report in International Application No. PCT/US2009/051598, dated Apr. 1, 2010.
International Search Report in International Application No. PCT/US2010/044196, dated May 3, 2011.
International Search Report in International Application No. PCT/US2010/058569, dated Aug. 22, 2011.
International Search Report in International Application No. PCT/US2010/022075, dated Jul. 28, 2011.
International Written Opinion in International Application No. PCT/US2009/065976, dated May 26, 2011.
International Written Opinion in International Application No. PCT/US2009/065038, dated May 24, 2011.
International Written Opinion in International Application No. PCT/US2009/051768, dated May 25, 2011.
International Written Opinion in International Application No. PCT/US2009/065985, dated May 25, 2011.
International Written Opinion in International Application No. PCT/US2009/065055, dated May 24, 2011.
International Written Opinion in International Application No. PCT/US2009/065987, dated May 25, 2011.
International Written Opinion in International Application No. PCT/US2009/051598, dated Feb. 7, 2011.
International Written Opinion in International Application No. PCT/US2010/044196, dated Mar. 1, 2012.
Nickitas-Etienne, Athina; Notification Concerning Transmittal of International Preliminary Report on Patentability (Chapter 1 of the Patent Cooperation Treaty); International Application No. PCT/US2009/065036; Date of Mailing May 24, 2011; Form PCT/IB/326 (1 page); Form PCT/IB/373 (1 page); Form PCTIISAl237 (5 pages).
US Final Office Action mailed Jun. 10, 2013, issued in U.S. Appl. No. 12/234,598.
US Office Action mailed Aug. 16, 2013, issued in U.S. Appl. No. 11/973,309.
US Office Action mailed Jun. 3, 2013, issued in U.S. Appl. No. 12/234,600.
Office Action in U.S. Appl. No. 12/234,600, mailed Dec. 6, 2013, 21 pages.

* cited by examiner

AUTHENTICATED FACSIMILE
TRANSMISSION FROM MOBILE DEVICES

CROSS-REFERENCE TO RELATED APPLICATIONS

This application claims priority to U.S. Provisional Application Ser. No. 61/117,912, filed Nov. 25, 2008, the entire contents of which are hereby incorporated by reference.

TECHNICAL FIELD

This subject matter relates to facsimile transmission.

BACKGROUND

A private branch exchange (PBX) is a telephone network that serves a business or an office. A virtual PBX (vPBX) allows a business or office to be served by a PBX system hosted on remote servers. The service is provided through a combined voice network (e.g. telephone network) and data network (e.g. Internet). A vPBX typically involves one or more voice-over-IP ("VOIP") servers, a call management program, a network, a gateway that links the voice network and data network, and one or more extensions. Conventional implementation of a vPBX system is not well suited for permitting mobile devices to send authenticated faxes.

SUMMARY

Fax documents can be uploaded to a central fax server by a user or generated dynamically. For dynamic generation, pre-configured templates can be stored either on a mobile device or on a central fax server. A mobile device can be used as a controlling device to direct generation of fax documents on the fax server. The generated fax documents can be downloaded back to the mobile device, digitally signed using an input device (e.g., a touch input device), and sent out to a destination fax machine or other fax capable device (e.g., a computer coupled to a printer). Alternatively, full fax generation can take place directly on a mobile device, space and capacity permitting. Alternatively, a mobile device can upload a stored digital signature onto the server, where the stored digital signature is placed into a fax document upon user request. The assembled fax document can then be sent to a destination from the fax server.

In some implementations, a fax document can be uploaded to a fax server or generated dynamically on a fax server. Fax document templates can be stored on the fax server. A user can use a mobile device connected to a vPBX network as a controlling device to direct generation of fax documents from fax document templates on the fax server. The generation of fax documents can be customized to a user based on a geographic location of the user's mobile device. Generated fax documents can be downloaded onto a mobile device. A user can digitally sign the fax document using a touch-sensitive screen interface on the mobile device. The digitally signed fax can be transmitted from the fax server to a destination fax machine.

In some other implementation, fax document generation can take place on a mobile device. A user can download a fax document template from a fax server to a mobile device, create a fax document based on the template, sign the fax document, and transmit the signed fax document to a destination fax machine or other device capable of receiving an electronic fax. In another implementation, a mobile device can upload a stored signature onto a fax server, where the signature is placed into an assembled fax document. The assembled fax document is then sent to the destination from the fax server.

The details of one or more implementations of authenticated fax transmission from location-aware mobile devices are set forth in the accompanying drawings and the description below. Other features, objects, and advantages of the techniques will be apparent from the description and drawings, and from the claims.

DESCRIPTION OF DRAWINGS

Like reference symbols in the various drawings indicate like elements.

DETAILED DESCRIPTION

Terminology

A private branch exchange ("PBX") is a telephone network system that servers a business or office, in contrast to a common carrier. A PBX system can include one or more VOIP servers, a call management program, and a gateway between data and voice network. A virtual PBX (vPBX) system is a PBX system whose VOIP servers, call management program, and gateway that are located remotely from the office or business, typically at a vPBX service provider. A mobile device is a portable computer device that can wirelessly connect to a data network or a voice network or both. A mobile device typically has a display screen or a keyboard, or both. A mobile device can be a cell phone, a personal digital assistant (PDA), a handheld device, etc. An extension is an internal device, such as a mobile device or landline phone, that is connected to a PBX system. The PBX system operates as a switchboard for the extensions. A user is a person who uses the vPBX system. A fax, or facsimile, is a telecommunication technology that transfer copies of documents over a packet (data) or switched (telephone) network. Unless otherwise specified, a sender is a person or device from whom or which a fax transmission originates, and receiver, or destination, is a person or device to whom or which a fax transmission is sent.

Call Management System Overview

Figure 1:
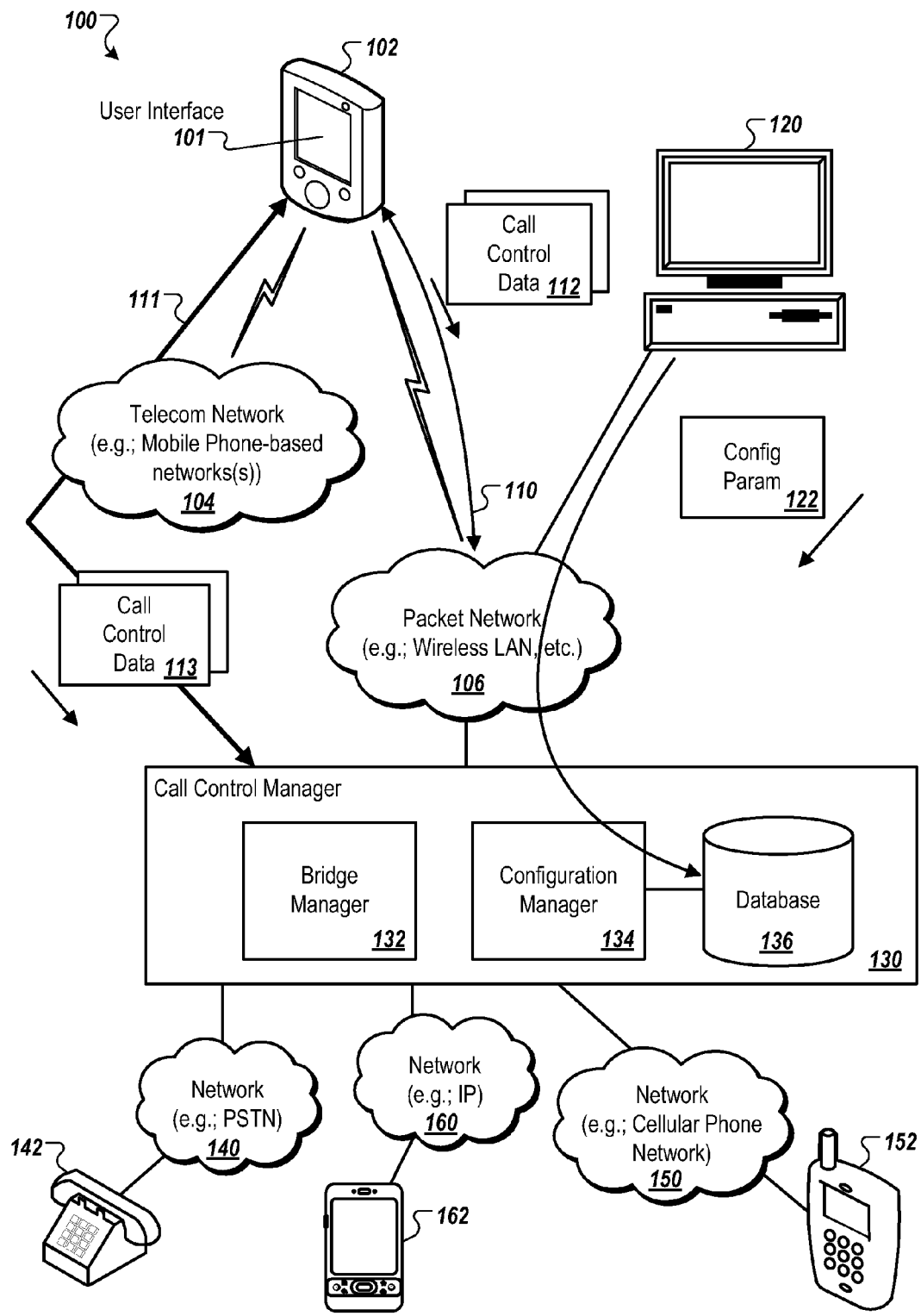
FIG. 1 is a block diagram of an example call management system, including a mobile device configured to interact with a call control manager.

FIG. 1 is a block diagram of a call management system 100, including a mobile device configured to interact with a call control manager 130. In this example, a mobile device 102 can be configured to communicate using multiple modes of communication (i.e., "multi-modal channels of communication"). Network 104 operates in accordance with a first mode of communication. Examples of the first mode of communication include Public Switched Telephone Network ("PSTN") phone technologies, cellular/wireless telephone technologies/standards, such as Global System for Mobile communications ("GSM"), Frequency Division Multiple Access ("FDMA"), Time Division Multiple Access ("TDMA"), Code division multiple access ("CDMA"), and the like. Network 106 operates in accordance with a second mode of communication. Examples of the second mode of communication include VOIP phone technologies, wireless LAN technologies (e.g., telephone technologies/standards, such as WiMAX and any other IEEE 802.xx-based technologies/standards), and the like. Any number of modes is possible.

Further to FIG. 1, mobile device 102 can be configured to interact with a call control manager 130, over a call control communications channel, which in some implementations can be a broadband call control channel 110. In some implementations, broadband call control channel 110 can be established in network 106 (e.g., in the same or separate channel used to convey voice/video data, such as in a Session Initiation Protocol ("SIP") message). Note that in some implementations, another narrowband call control channel 111 can be established in network 104 (e.g., a mobile operator can provide in the same or separate channel used to convey voice/video data, such as in an Short Message Service ("SMS") message). Mobile device 102 and/or call control manager 130 can be configured to establish narrowband 111 and/or broadband 110 call control channels so mobile device 102 and/or call control manager 130 can transmit and/or receive call control data 113 (over the narrowband call control channel 111) and/or 112 (over the broadband channel 110). Call control manager 130 can be configured to effect a number of call controlling functions that can be performed remotely from mobile device 102. Thus, call control manager 130 can perform call control operations in association with a first call from a phone 142 via network 140 and/or a second call from a phone 152 via network 150 and/or a second call from a phone 162 via a network 160. In one implementation, call control manager 130 can be disposed in a central office ("CO"). In another implementation, mobile device 102 includes an interface, such as a user interface 101, for facilitating generation, receipt, and processing, and management of call control data 112 and 113 for delivery over narrowband 111 and/or broadband 110 call control channels. Interface 101 can be configured to implement the functionalities described therein, including receiving inbound calls, dialing outbound calls, and click to call generating a combined inbound and outbound call.

In at least some implementations, call control manager 130 includes a bridge manager 132, a configuration manager 134, and a repository ("DB") 136. Bridge manager 132 can be configured to perform inbound call delivery, call routing, call transfer functions, conference call functions, and the like, for mobile device 102. Note that call control manager 130 provides for bridging calls generated by disparate telecommunications technologies associated with communications devices 142 and 152 and 162. For example, as an alternative to answering an inbound call on mobile device 102, the call can be recorded (such as voice mail) on mobile device 102 and/or on the call control manager 130 and simultaneously reviewed on mobile device 102 via user interface 101. During call recording, the inbound call can be answered dynamically at mobile device 102 and/or transferred to one or more of communications devices 142, 152, and 162. Completed recordings (e.g., announcements, voice mail, etc.) can be reviewed at mobile device 102 via user interface 101.

Configuration manager 134 can be configured to interact with a remote computing device 120 or with a mobile device 102 to receive configuration parameter data ("conf param") 122. Further, configuration manager 134 can be configured to store configuration parameter data 122, and responsive to such data, call control manager 130 can be implemented by a user to control inbound calls before, during, or after reaching mobile device 102. Further, configuration manager 134 can be configured to store in database 136 audio files recorded via user interface 101 on device 102 and transmitted to call control manager 130 via narrowband 111 and/or broadband 110 call control channels.

Example Call Manager

Figure 2:
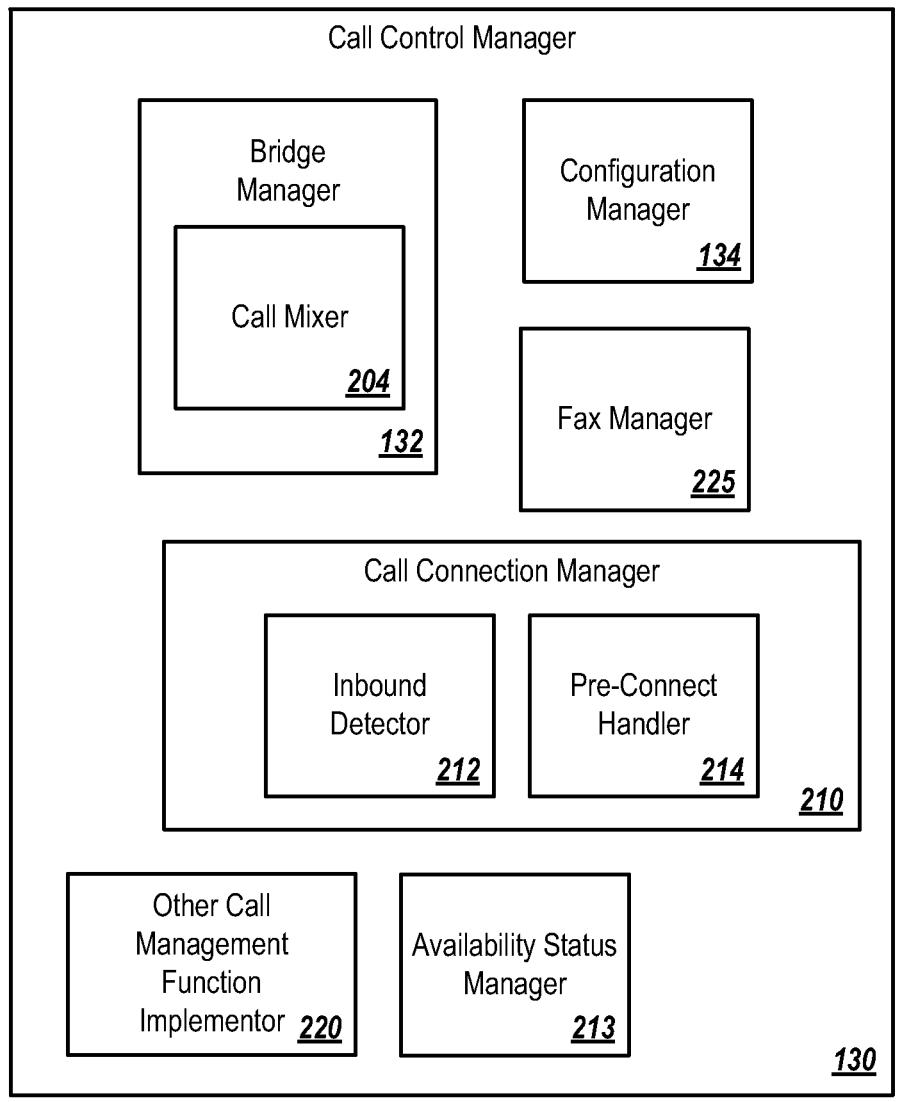
FIG. 2 is a block diagram of an example call control manager.

FIG. 2 is a block diagram of an example call control manager 130. Call control manager 130 is shown to include a bridge manager 132, a configuration manager 134, a call connection manager 210, an available status manager 213, a fax manager 225, and a call management function 220 configured to implement any other call control functions described herein. Bridge manager 132 can include a call mixer 204. In some cases, call mixer 204 can be configured to combine calls using various telecommunication technologies and protocols. Thus, call mixer 204 can use different CODECs to implement the various telecommunication technologies and protocols. In some cases, mixer 204 can reside in the mobile device, which can be a mobile device 102. Call connection manager 210 can include an inbound detector 212 and a pre connection handler 214. Inbound detector 212 can detect a call from any communications device (e.g., communications devices 142 or 152 or 162 of FIG. 1) and can determine whether a communication link via network 106 of FIG. 1 to mobile device 102 can be established. For example, inbound detector 212 can communicate with mobile device 102 to determine whether a data rate of more than, for example, 8 kb/sec is obtainable. If not, inbound detector 212 can provide a course of action (e.g., sending the call to voicemail) until the data rate is above some acceptable threshold. Pre-connect handler 214 can interact with mobile device 102 to receive an instruction from call control data 112 to handle a call from either communications device 142 or communications device 152 of FIG. 1 before a connection is made. Pre-connect handler 214 can also interact with mobile device 102 to receive an instruction from call control data 113 to handle a call form any of communications devices 142, 152, and 162 of FIG. 1. For example, call control data 113 can be incorporated into an SMS message (or any other type of messaging protocol) capable of transport via network 104. Thus, mobile device 102 can generate call control data 113 that includes an instruction that causes call control manager 130 to generate a message to any of communications devices 142, 152 and 162 of FIG. 1. An example of such a message is "I am out of wireless LAN range. I will call you later when I can make a VOIP call." Any of the components of call control manager 130 can be implemented in hardware or software, or a combination thereof.

Example Mobile Device Implementation

Figure 3:
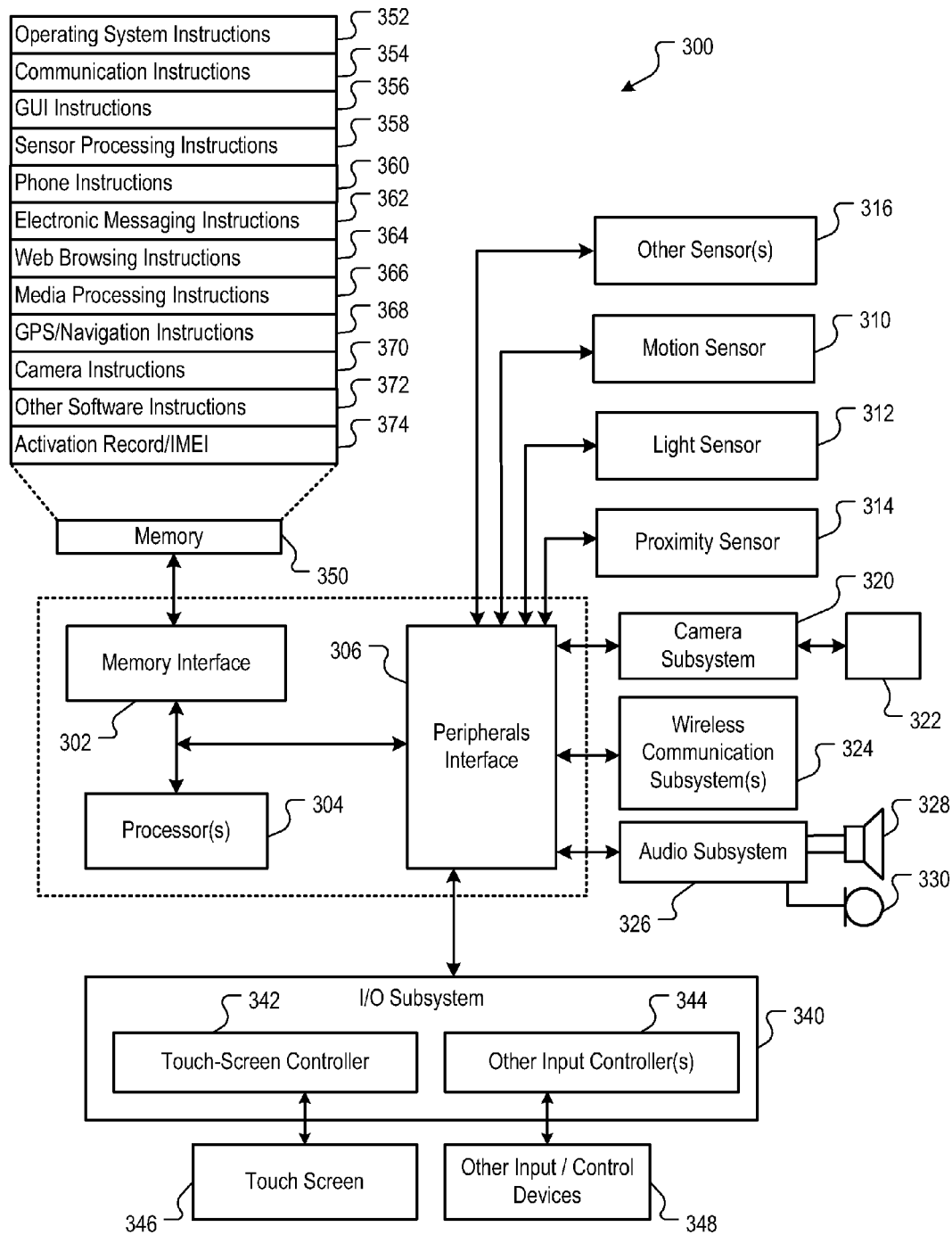
FIG. 3 shows example system architecture of a mobile device.

FIG. 3 is a block diagram of an example implementation 300 of a mobile device (e.g., mobile device 102). The mobile device can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device can be coupled by one or more communication buses or signal lines.

Sensors, devices, and subsystems can be coupled to the peripherals interface 306 to facilitate multiple functionalities. For example, a motion sensor 310, a light sensor 312, and a proximity sensor 314 can be coupled to the peripherals interface 306 to facilitate orientation, lighting, and proximity functions. Other sensors 316 can also be connected to the peripherals interface 306, such as a positioning system (e.g., GPS receiver), a temperature sensor, a biometric sensor, or other sensing device, to facilitate related functionalities.

A camera subsystem 320 and an optical sensor 322, e.g., a charged coupled device ("CCD") or a complementary metal-oxide semiconductor ("CMOS") optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device is intended to operate. For example, a mobile device can include communication subsystems 324 designed to operate over a GSM network, a GPRS network, an EDGE network, a Wi-Fi or WiMax network, a 3-G network, and a Bluetooth™ network. In particular, the wireless communication subsystems 324 can include hosting protocols such that the mobile device can be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration can disengage a lock of the touch screen 346; and a pressing of the button for a second duration that is longer than the first duration can turn power to the mobile device on or off. The user can be able to customize a functionality of one or more of the buttons. The touch screen 346 can, for example, also be used to implement virtual or soft buttons and/or a keyboard.

In some implementations, the mobile device can present recorded audio and/or video files, such as MP3, AAC, and MPEG files.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 can include instructions for handling basic system services and for performing hardware dependent tasks. In some implementations, the operating system 352 can be a kernel (e.g., UNIX kernel).

The memory 350 can also store communication instructions 354 to facilitate communicating with one or more additional devices, one or more computers and/or one or more servers. The memory 350 can include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other processes and functions, e.g., access control management functions as described in reference to FIGS. 5 and 6. The memory 350 can also store other software instructions (not shown), such as web video instructions to facilitate web video-related processes and functions; and/or web shopping instructions to facilitate web shopping-related processes and functions. In some implementations, the media processing instructions 366 are divided into audio processing instructions and video processing instructions to facilitate audio processing-related processes and functions and video processing-related processes and functions, respectively. An activation record and International Mobile Equipment Identity ("IMEI") 374 or similar hardware identifier can also be stored in memory 350.

Each of the above identified instructions and applications can correspond to a set of instructions for performing one or more functions described above. These instructions need not be implemented as separate software programs, procedures, or modules. The memory 350 can include additional instructions or fewer instructions. Furthermore, various functions of the mobile device can be implemented in hardware and/or in software, including in one or more signal processing and/or application specific integrated circuits.

Example Fax Process

Figure 4:
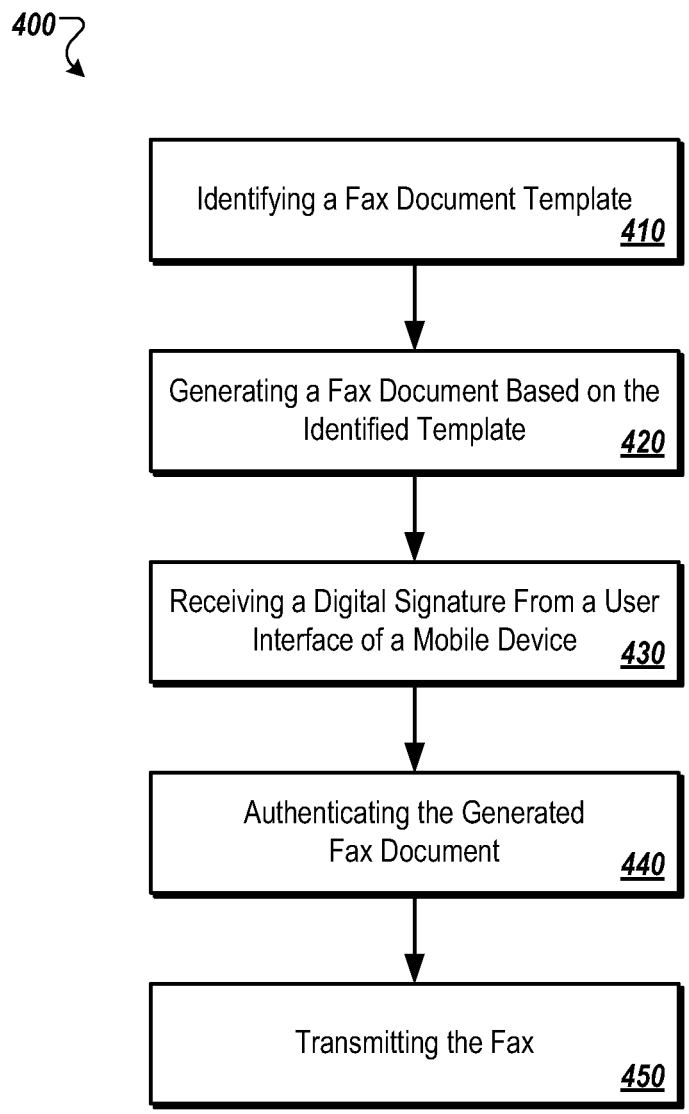
FIG. 4 is a flowchart illustrating an example process for authenticated facsimile transmission from a mobile device.

FIG. 4 is a flowchart illustrating an example process 400 for facsimile transmission from a mobile device. In step 410, a fax document template is identified. The identified fax document can be retrieved from a storage device. Identifying a fax document can include selecting a fax document template from a storage device on a server, and downloading the fax document template to a mobile device.

A fax document template can contain formatting information and company specific information, such as a company logo, address, phone number, and boilerplate languages. A fax document template can also contain one or more placeholders for sender and receiver information, such as user name, position, and extension number. A fax document template can further contain metadata that can be use to configure a fax-sending device to control the fax sending process. For example, a fax document template can be configured to permit a sender to send a fax based on the template only after the fax is signed by a supervisor of the sender. A fax document template can also contain metadata that can disable some senders to send out faxes to some receivers, or to enable a fax to be automatically archived in an archiving system.

A fax document template can be created by a user on a mobile device. A user can use editing functions on a mobile device to create, edit, and delete a fax document template on the mobile device. A user can download and upload a fax document template from and to a fax server. The download and upload can be through Hypertext Transfer Protocol ("HTTP") or other data transfer protocols. Alternatively, a user can use a mobile device as a terminal to create, edit, and delete fax document templates directly on a fax server. A fax document template can be given various levels of access limitations, such as "private to the creator," "available to a group," or "available to all users" in a vPBX network. A group can be configured to include one or more users in the vPBX network. An example group can be a bridged line appearance (BLA) group, an extension in which can display status of other extensions in the same group.

A fax document template can be stored on a fax server in a vPBX network. A fax server can be a fax manager 225 in a vPBX server 200. A fax server can also be a distinct, dedicated fax device in the vPBX network. The fax server can contain a repository for all fax document templates. A user with administrative authority can manage all templates in a repository through a mobile device. A user without administrative authority can manage templates created by the user, or templates that have access rights that permit the templates to be edited by the user.

In some implementations, a fax document template can be retrieved from a storage device to the memory of a user's mobile device. In some other implementations, a fax document template can be retrieved from a storage device to memory on a fax server. A mobile device can be configured to function as a remote control terminal of a fax server, performing administrative and editorial tasks on the fax server.

In a next step 420, a fax document is generated based on a fax document template identified in step 410. Generating a fax document can include inserting sender-generated content, inserting values to predefined fields in a fax document template and inserting fax content into a fax document template. Inserting values to predefined fields can include inserting a user's identity, phone extension number, and address.

To insert sender-generated content, a vPBX system can receive user input from a mobile device. A user can type text message on a keyboard on a mobile device, or by tapping a virtual keyboard displayed on a display screen. A user can also draw sketches on a touch-sensitive display screen. The user input can be transmitted to a vPBX server. After receiving the user input, the vPBX server can insert the received user input into predetermined fields of the fax document template.

To insert a user's identity values, a vPBX system can determine the user's identity by identifying the mobile device that has been assigned to a user, by requiring user authentication, or both. User authentication can include requiring a user to log in to the vPBX system with a user name and a password. The authentication can also include time and location based limitations, which will be described below. Login information and other authentication information can be transmitted in a secure communication channel. A wireless communication channel can be secured using various security protocols. For example, a wireless communication channel can be secured using a certification program such as Wi-Fi Protected Access ("WPA" and "WPA2"). As another example, an Internet protocol can be secured using Secure Sockets Layer ("SSL").

To insert extension numbers, a vPBX system can select a number according to an extension number field in a fax document template. In some implementations, an extension number field can be configured to allow a vPBX server to insert the extension number of the mobile device from which the fax is sent. An extension number field can also be configured to allow a vPBX server to insert a main extension number of the sender. A vPBX server can determine a user's main extension number by querying a user contact information database. In some other implementations, a vPBX system can insert a main office number, or a primary line number of a bridged line appearance ("BLA") group number.

To insert an address, a vPBX system can select an address according to an address field in a fax document template. In some implementations, an address field can be configured to allow a vPBX server to insert a main office address. A vPBX system can determine a user's office address by querying a user contact information database. In some other implementations, a PBX system can insert a current physical address of the sender. The current physical address of a user can be determined by a current geographic location of a location-aware mobile device and a geographic referencing system. A mobile device can be a location-aware mobile device when the mobile device is coupled with, or connected to, a positioning system such as a GPS. A vPBX server can track a mobile device's geographic location by retrieving the mobile device's geographic coordinates through an availability status manager 213. In yet some other implementations, a vPBX server can combine a current geographic location of the mobile device with a user contact information database. For example, a company can have an office in Boston, and another office in Dallas. A Boston office address can be entered into the fax document as sender address when the vPBX system determines that the mobile device is sending the fax from Boston, and otherwise, by default, a Dallas office address can be used.

The geographic coordinates of the mobile device can be determined in a variety of ways. For example, a GPS receiver integrated with, or coupled to, the mobile device can determine the physical location of the mobile device. A triangulation program can also determine the physical location of the device, by way of measuring the relative position of the mobile device against reference places with ascertained geographic positions, e.g., extremely low frequency ("ELF") and microwave (cellular phone) transmission towers. The relative position can be measured, for example, by calculating a time difference between the towers for receiving a signal from the mobile device. The triangulation program can operate on a server in a network to which the mobile device is connected. The triangulation program can also operate on the mobile device, by way of keeping a list of reference places one the mobile device.

The geographic coordinates can be mapped to a current physical address based on a mapping system that maps latitude-longitude coordinates with physical addresses. An example mapping system is the Topologically Integrated Geographic Encoding and Referencing system ("TIGER") of the United Status Census Bureau. Another example mapping system can be Google Maps, which provides a Web based application programming interface ("API") for identifying addresses based on geographic coordinates and identifying geographic coordinates based on addresses.

In addition to inserting values to fields in a fax document template, a sender can insert text into the fax document template in step 420. A sender can enter text into the fax document template that has been downloaded into memory on a mobile device. Entering text can include typing on a keyboard, tapping on a displayed keyboard on a touch-sensitive screen, or handwriting letters and characters on a free-hand writing area on the touch-sensitive screen. Alternatively, a user can use a mobile device as a remote terminal to enter text into the fax document template that has been loaded into memory on a fax server. Entering text can also include selecting from a collection of pre-entered text for one or more particular fields in the fax document template. The pre-entered text can include, for example, various versions of standard language for greetings, referencing subject matters, and disclaimers. Each version can be tailored for one or more specific fax recipients. The various versions of the pre-entered text or portions of the pre-entered text can be displayed on the touch-sensitive screen. A user can select a particular version of the text to enter into a field by, for example, tapping on the version of the text.

In a next step 430, a vPBX system can retrieve a user's signature from a mobile device. In many circumstances, a fax transmission requires a sender signature. In some example implementations, a user signs a fax by writing a signature on a touch-screen of a mobile device. The signature can be in a form of freehand drawing. A freehand drawing can be inserted into a signature area of a fax document template. In another example implementation, a user's freehand input on a mobile device can be used to identify the user. A vPBX server identifies a user by matching a signature with stored signature images or stored user names. Image comparison tools and character recognition and approximation methods can be used. An example mobile device that can receive freehand drawing as input and can map the freehand drawing input with stored character sets is an Asian character input system on an iPhone™ made by Apple Inc., Cupertino, Calif. Once a vPBX server successfully maps a handwritten signature with a stored signature or a stored user, the vPBX server can insert the stored signature in the document.

In some other example implementations, a user can instruct a fax server to insert a signature into a fax document after electronically logging in to a vPBX system. A fax server can insert a pre-stored digital signature to an out-going fax after authenticating the user. An authentication can be through a username and password combination. An authentication can also include location-based identification in addition or as an alternative to username and password combination. For example, to authenticate a user, a vPBX server can require the input of a user name, a user password, and a user location. The user location can be determined by the geographic coordinates of the mobile device. A user is determined to possess signatorial authority only if the combination user name, password, and geographic coordinates of the mobile phone match a pre-determined combination.

In some implementations, a user can be authenticated by a user name and password combination only if the user is physically in office. A vPBX server can infer that a user is in office by determining that the user's mobile device is in the office. A vPBX server can determine that the user's mobile device is in office by matching geographic coordinates of the mobile device with a set of pre-stored geographic coordinates, which are designated as "office" in a location database. In some other implementations, a user can be authenticated only during a pre-defined time window, e.g., 9 am to 5 pm. The time window requirement can be applied in addition to or independent from the geographic location of a mobile device to create enhanced security measure.

In a next step 450, an authenticated fax document is transmitted to one or more destinations. In some implementations, a fax server can send multiple faxes to multiple recipients. A fax server can send a fax to either a receiving device on Public Switched Telephone Network ("PSTN") or a receiving device on an IP network.

Example Processes for Fax Transmission

Figure 5A:
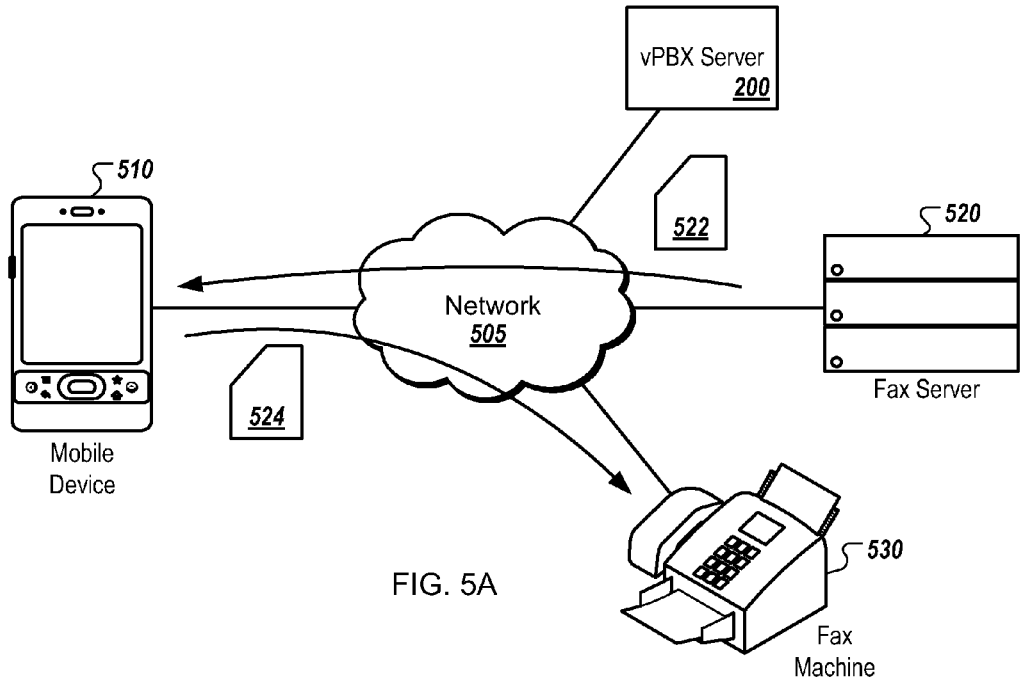
FIGS. 5A and 5B are diagrams of two examples processes for transmitting faxes from a mobile device.
Figure 5B:
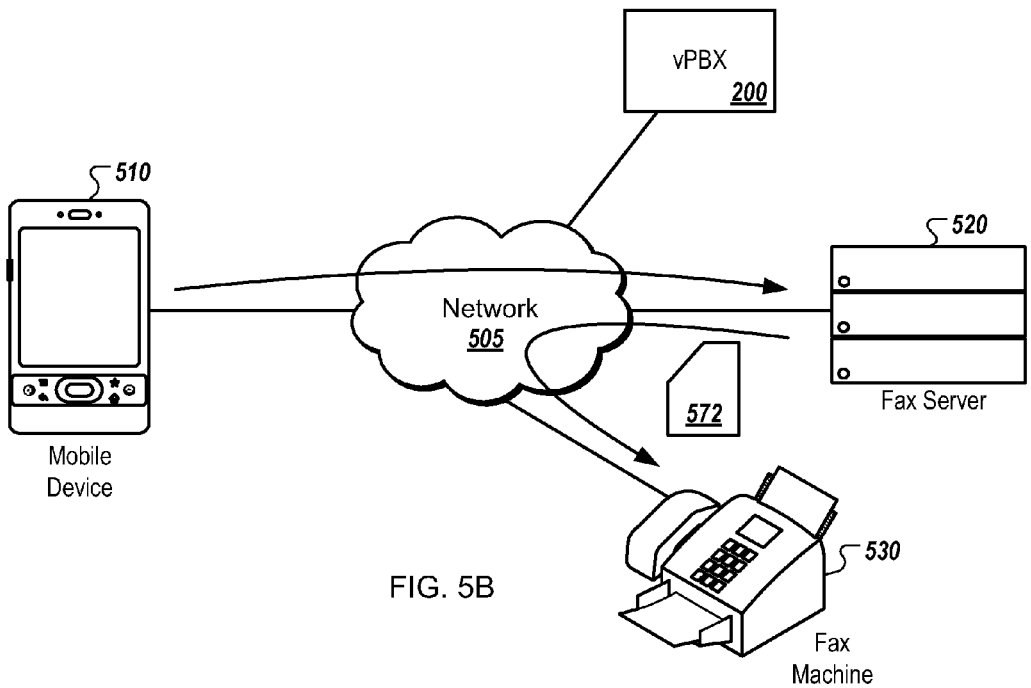

FIGS. 5A and 5B are diagrams of two examples processes for transmitting faxes through a mobile device. FIG. 5A illustrates a process in which a mobile device sends out a fax to a recipient 530. In FIG. 5A, mobile device 510 is connected to a vPBX network. The vPBX network can include at least one vPBX server 200. A vPBX server 200 can include a call control manager 130 that includes a fax manager 225. The vPBX network also includes a fax server 520. A Fax server 520 can be part of a vPBX server 200, or can be a separate entity. The fax server 520 can be managed by a fax manager 225. Mobile device 510, vPBX server 200, and fax server 520 are connected by a communications network 505. Communication network 505 can be a data network (e.g., Internet) or a switched network (e.g., PSTN) or both. The data network and switched network can be connected by a telephony gateway. A destination fax machine can be within a vPBX system or outside the vPBX system. A destination fax machine can be a fax machine on a PSTN network or on a data network.

In an example implementation, mobile device 510 retrieves fax document template 522 from a fax server 520 into the memory of mobile device 510. The retrieval of fax document template 522 can be a data transfer through HTTP protocol. The data transfer can be managed by the fax manager 225 in the vPBX server 200. After retrieving fax document template 522 from fax server 520, the vPBX system can permit a user to insert text in the fax document template 522. The vPBX system can insert some or all data fields in the fax document template 522. Alternatively or additionally, a user can insert some or all data fields in the fax document template 522, to generate a fax document 524.

A user can authenticate the fax document 524 by providing a signature. The signature can be a hand-written signature on a touch-sensitive screen on the mobile device 510. The signature can be inserted into the fax document 524 as an image. The signature can also be another form of electronic signature. The signed fax document can be sent to a destination device 530 either directly from mobile device 510 or from a fax manager 225 in vPBX server 200.

In one example implementation of sending authenticated faxes from a mobile device, mobile device 510 can send the signed fax document 524 to a destination fax machine 530. The sending of the fax document can be achieved by creating a virtual connection between mobile device 510 and destination fax machine 530. The connection can be managed by a vPBX server, through a telephony gateway server 580 ("TGS," see FIG. 5C below).

In another example implementation of sending authenticated faxes from a mobile device, a user can send the signed fax document through a fax manager 225. In a first step, the fax document is sent from mobile device 510 to vPBX server through an Internet Message Access Protocol (IMAP), Post Office Protocol 3 (POP3), Simple Mail Transfer Protocol (SMTP), or other readily available messaging protocols. In a second step, fax manager 225 can perform record keeping tasks such as archiving the fax document, recording user information, recording billing information, etc. In a third step, fax manager 225 can send the fax to destination fax machine 530. The transmission between fax manager 225 and destination fax machine 530 can be through a messaging protocol or a fax over IP (FoIP) protocol, such as a T.38 fax relay standard.

FIG. 5B illustrates another implementation of sending authenticated faxes from a mobile device. Mobile device 510, vPBX server 200, and fax server 520 are connected by a network 505. Fax server 520 stores fax document templates. Mobile device 510 instructs fax server 520 to create a fax document and send the fax document to a destination fax machine 530. Mobile device 510 can send the fax instruction by selecting fax document template, creating fax document, signing the fax document, and providing a fax destination number to a fax manager 225 in vPBX server 200.

In some example implementations, mobile device 510 can act as a remote display device for fax server 520. Mobile device 510 can select a fax document template from a plurality of fax document templates stored on fax server 520. Mobile device 510 can instruct fax server 520 to load the selected fax document template to a memory area on fax server 520. Mobile device 510 can invoke a word processing program on either mobile device 510 or fax server 520 to edit the selected fax document template, including manually or automatically inserting values to data fields, inserting text, and inserting recipient name and number to generate a fax document 572. Mobile device 510 can authenticate fax document 572 by digitally signing fax document 572. The digital signature can be entered by a user on a touch-sensitive screen of mobile device 510. The digital signature can also be pre-stored on fax server 520. The digital signature can be inserted into the fax document 572 upon the fax server's authenticating a user's identity. The fax server 520 can authenticate a user's identity through a login process, whereupon a user enters a username/password combination. The fax server 520 can also authenticate a user's identity by requiring the user's mobile device at a predefined geographic location, such as in office, or at a certain address. The fax server 520 can also authenticate a user's identity by applying a biometric security technology. For example, the fax server 520 can compare a user's voice with a stored voice sample; the fax server 520 can apply facial recognition technology on a self-portrait of a user, if the user's mobile device includes a real-time image capturing device such as a built-in camera; the fax server can also require a user to perform a pre-defined physical movement, such as waving a mobile device in a specific form, if the user's mobile device can sense motion; the fax server can also apply voice recognition technology, based on a voice capturing device integrated with or coupled to the mobile device (e.g., a microphone built in or connected to the mobile device).

Fax server 520 can archive the fax document 572 and send fax document 572 to a destination fax machine 530. Sending a fax document through a fax server 520, rather than from mobile device 510, can have an advantage of "send and forget" feature. Destination fax machine 530 can be busy or unavailable. A fax server 530 can be configured to implement re-dialing functions when fax machine 530 cannot receive a fax transmission. The re-dial function can attempt to resend the fax document 572 after preconfigured intervals, e.g., redial immediately, redial again after one minute, redial again after five minutes, etc. Fax server 520 can also create an error report after certain number of redials. The redial and error reporting functions on fax server 520 can be configured and controlled on mobile device 510. If the redial and error reporting functions are implemented on fax server 520, a user of mobile device 510 can "forget" the fax after the user presses a "send" button. The user can perform other functions on the mobile device 510 while the fax server 520 attempts resends.

Figure 5C:
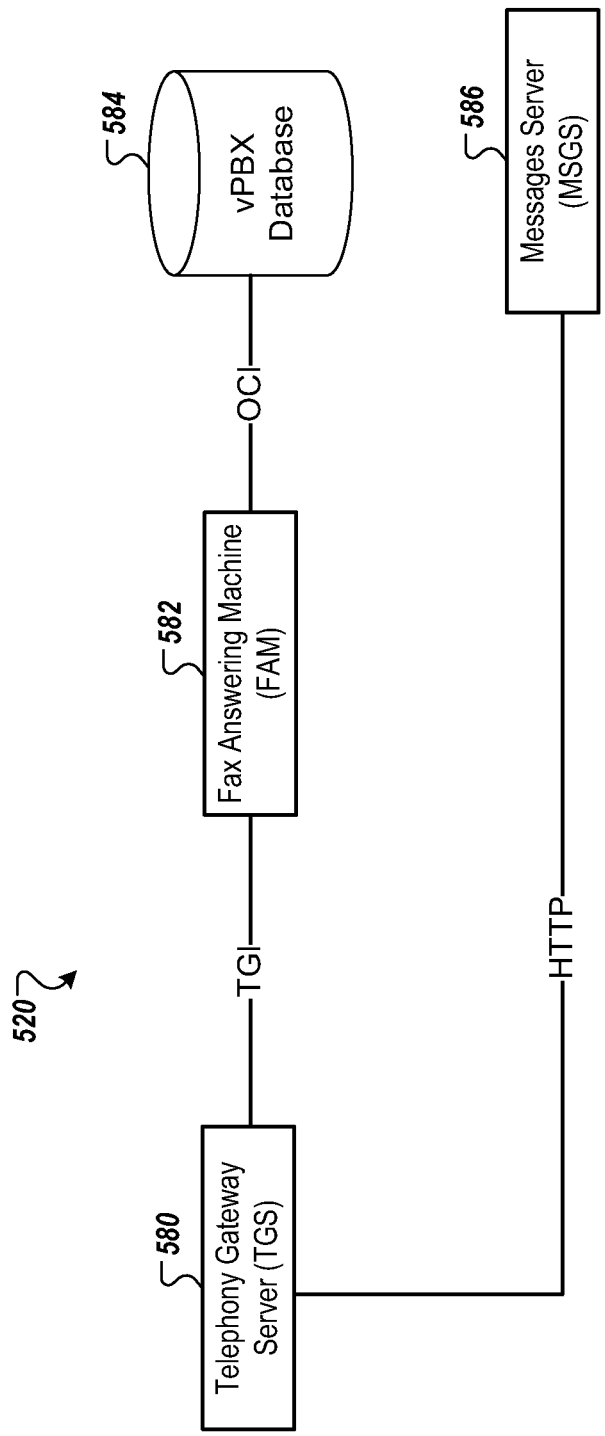
FIG. 5C is a diagram showing an example structure of a fax server.

FIG. 5C is a diagram showing an example structure of a fax server 520. A fax server 520 can manage the sending of outgoing faxes. Incoming faxes can be received by an individual extension, including a fax machine, or a mobile device in the vPBX network.

A vPBX database 584 supports the fax server 520. The database 580 can store fax server configuration, references to documents to be faxed, references to fax document templates, references to archives of faxed documents, and other fax related information. Database 584 can be implemented in a relational database management system ("RDBMS"), an object-oriented database system, or a plain file system. Database 584 is typically hosted by a database server, but can be hosted by a mobile device that has sufficient processing power and input/output throughput, such as a mobile device on a 3G network.

A fax answering machine 582 ("FAM") handles fax queues. A FAM 582 is a program that runs on one or more computers. When running on a Windows based computer, a FAM 582 can be implemented as a Windows Service. When running on a UNIX based computer, a FAM 582 can run as a cron job. A fax queue is a collection of fax documents that are ready to be sent to recipients. A fax document enters the queue when a user on a mobile device taps "Send" button on a mobile device. A FAM 582 can also resend a fax at given intervals when one or more prior attempts to send fail. Further, a FAM 582 can be configured to send fax documents at predetermined time. Such fax sending jobs can be implemented on a UNIX based system as cron jobs. A FAM 582 can be configured to send a single fax document to a large number of recipients. A FAM 582 can be linked to the database 584 using various database interfaces. For example, if database 584 is implemented using an Oracle database, such as Oracle 10g, the link between FAM 582 and the Oracle database can be based on Oracle Call Interface ("OCI").

A Telephony Gateway Server 580 ("TGS") executes requests from FAM 582. A TGS 580 can make outbound calls, download or upload files to and from a massages server 586 ("MSGS"), and send faxes. The TGS can be connected to a switched network (e.g., a telephone network), and therefore can be a "gateway" between a packet network and the switched network. A TGS 580 communicates with a FAM 582 using a telephony gateway interface ("TGI"), which can be a protocol of communication between TGS 580 and FAM 582.

An MSGS 586 can store messages. Messages can be voice messages or data messages (such as a fax document). For example, MSGS 580 can physically store documents to be faxed, fax document templates, and archives of faxed documents. The references to the document stored on MSGS 580 can be stored in the vPBX database 584. The TGS 580 can communicate with the MSGS 580 via a variety of protocols, such as HTTP.

Example Processes for Signing a Fax

Figure 6B:
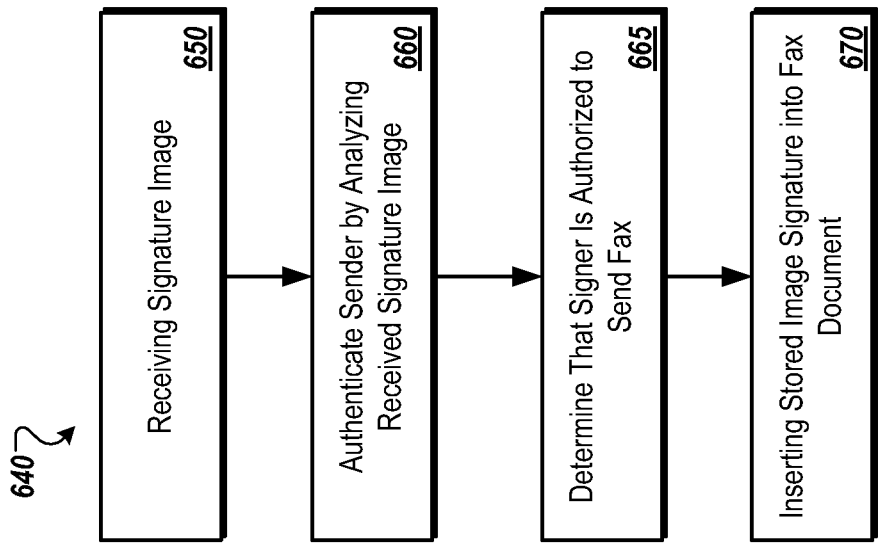
FIGS. 6A and 6B are flowcharts illustrating two example processes for signing a fax document.
Figure 6A:
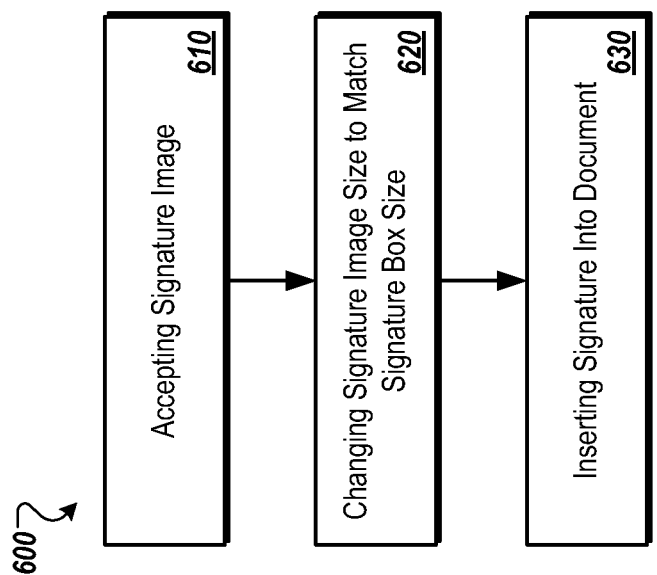

FIGS. 6A and 6B are flowcharts illustrating two example processes for signing a fax document. In FIG. 6A, a vPBX server inserts a signature image into a fax document in an example process 600. In step 610, a vPBX system accepts a user's signature as an image. A user may enter a signature on a touch-sensitive screen of a mobile device through a signature-input user interface. A signature image is an image of a user's hand-written signature. A user can generate a signature image on a mobile device in a variety of ways. In some implementations, a user can store a pre-generated signature image on a mobile device. The pre-generated signature image can be cropped from a scanned file. However, storing an image signature on a mobile device can create the risk of reduced privacy protection when the user's mobile device containing a signature is lost or stolen. In some other implementations, a user can create a signature image on the fly, when a signature is required to authenticate a fax. The signature image can be discarded from the mobile device after a fax is sent, reducing risk of misuse when the mobile device is lost or stolen.

A user can create a signature image on the fly in a variety of ways. For example, on a mobile device that has a touch-screen input device, a user can create a signature image by writing on the touch-screen with a stylus or with a finger. A signature image is generated by tracing the movement of the stylus or the user's finger on the touch screen interface of the mobile device. For a mobile device that is integrated with or coupled to a motion-sensing device such as a gyroscope or an accelerator or both, a user can wave the mobile device and draw a signature in the air. A mobile device can detect the user's hand movement with the motion-sensing device and create a signature based on the user's hand movement. A signature image is generated by tracing the mobile device's waving motion.

In a next step 620, a mobile device proportionally resizes the signature image to a standard signature size. The standard size can be pre-defined in a fax document template, where a signature field's geometry can be specified. A signer can also create, edit, or delete a standard size, for example, by dragging and resizing a signature image on the display screen of the mobile device.

In a next step 630, a mobile device or a fax server inserts the signature into the fax document. The signature can be at a fixed position in the fax document, or can be in a "floating" position, when a user drags-and-drops the signature image to a place. The fixed position or floating position can be defined in a fax document template. The insertion of a signature image can differ from insertion of a regular image. An insertion of a signature can "lock" a fax document. Locking a fax document disables further modification of data and text fields in the fax document. If a user attempts to edit a fax document after the user signs the fax document, the user's previous signature can be removed. The user is required to sign the fax document again before transmission. If a user other than the user has signed a fax document, the user's editing of the fax document is disabled. The user can add the user's own signature to a fax document after another user has signed the fax document if multiple-signature function is configured for the fax document. Multiple-signature functions can be implemented on a fax manager 225, and managed by a mobile device.

In FIG. 6B, in an example process 640, a vPBX server can insert a pre-generated signature into a fax document after authenticating a user. The actual signature inserted by process 640 can visually differ from a signature image entered by a user. The example implementation illustrated in FIG. 6B can be useful when a standard signature needs to be inserted into a fax document. For example, a standard signature can include anti-counterfeit lines in addition to a signer's free-hand signature, which can be short, wavy, and multi-colored lines surrounding a free-hand signature. A standard signature can also include a company seal.

In step 650, a vPBX server receives a user's signature as an image. A user can enter a signature on a touch-sensitive screen of a mobile device through a signature-input user interface or by waving a mobile device that is integrated with or coupled to a motion-sensing device. Instead of using the received signature as a signature image to insert into a fax document, a vPBX server can use the received signature as a way to authenticate the user, before inserting a pre-stored signature image into the fax document.

In a next step 660, the vPBX server authenticates a signer by analyzing the received signature image. The authentication can determine that the signer is a person that the signer claims to be. Although a vPBX server can have knowledge on which extension (and which mobile device) is assigned to which user, it is possible that another user is using the device to sign a fax document. Therefore, the vPBX server can have a feature to further authenticate the sender by signature. A user's signature image is compared with an image stored on a fax server. The comparison can be implemented by various available image comparison or signature recognition processes. An existing signature recognition process can include the steps of feature extraction, element comparison, signature score calculation, etc.

In a next step 665, a vPBX server can determine whether the signer, authenticated, is authorized to send a fax a document. A list of persons authorized to send a fax document is stored in a fax server. The list of persons can be associated with other data in the fax server to provide restrictions on fax transmissions. Some example restrictions can be: a certain user can only send fax transmissions to a list of destination numbers; a certain user is associated with certain billing accounts; a certain user can only send fax transmissions from authorized locations, etc. A vPBX server can enforce an authorized location rule by permitting a mobile device to send a fax only when the mobile device's current geographic location is at a pre-defined location. The mobile device's current geographic location can be retrieved from a positioning system to which the mobile device is attached or connected.

A next step 670 can be inserting a stored signature image into a fax document. The signature image can be either the signature images received in step 650, or another signature image stored on a fax server. Step 670 can allow a vPBX fax server to insert a signature to a plurality of fax documents without a user having to sign each fax document individually.

Example User Interface For Signing a Fax

Figure 7:
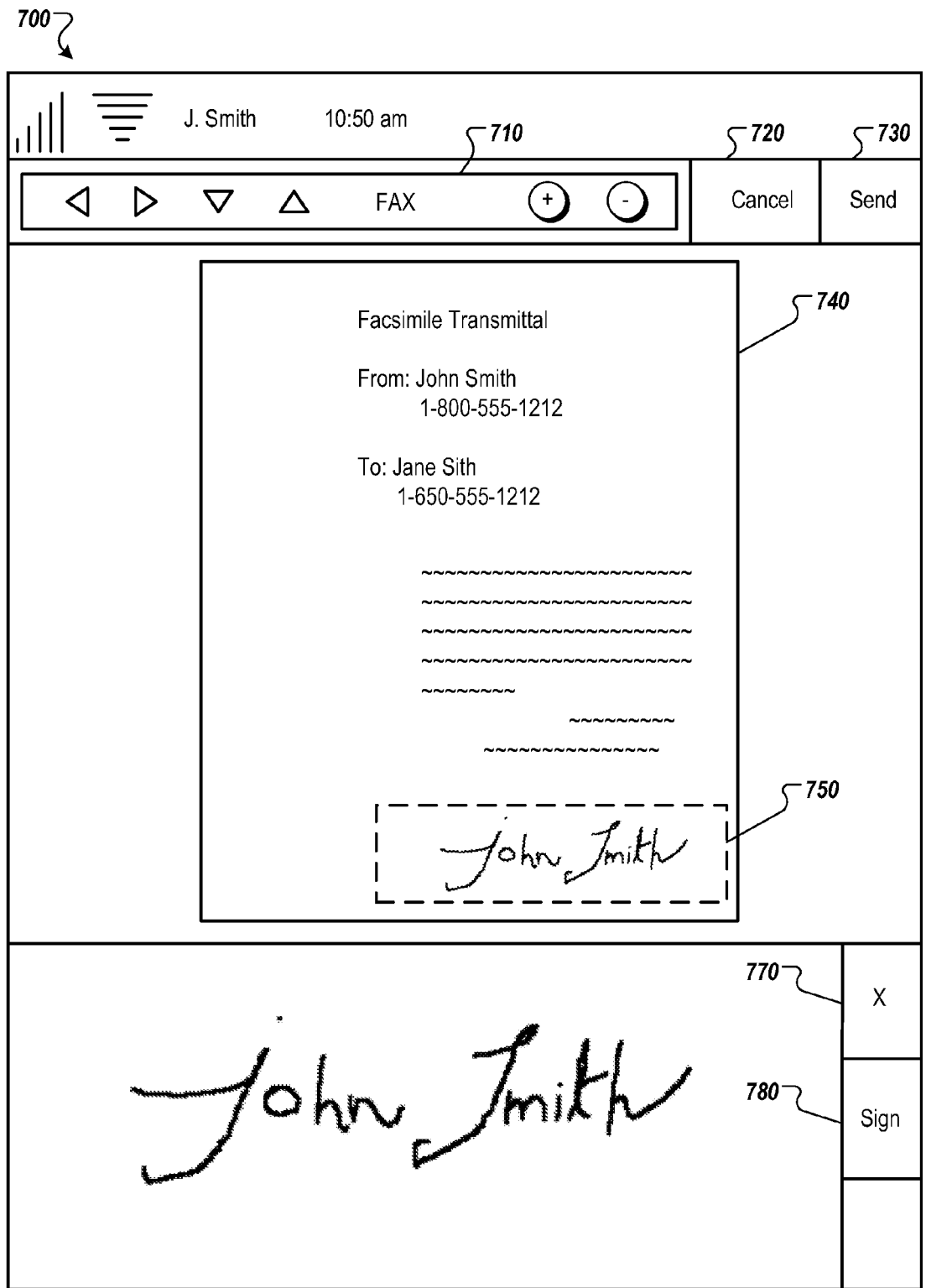
FIG. 7 shows an example user interface for signing a fax document.

FIG. 7 shows an example user interface for signing a fax document. An example touch-sensitive display screen 700 for a mobile device is shown. A user has created a fax document in the memory of the mobile device. The content of the fax document is shown in fax document box 740. In some implementations, a user can view and edit the fax content by tapping and dragging fax document box 740. In some other implementations, a user can navigate the fax document box 740 by using a navigation bar 710. Navigation bar 710 can contain scroll buttons to allow a user to scroll up, down, left, or right. Navigation bar 710 can also contain zoom buttons to allow a user to zoom in or zoom out.

Touch-sensitive screen 700 can display a signature input area 760. A user can provide a hand written signature by signing in the signature input area 760 with a finger, a touch stylus pen, or any other device that can draw on a touch-sensitive screen or device. A user can also provide a handwritten signature by other means. For example, if a mobile device is coupled with or is connected to a motion sensor, a user can create a signature by waving the mobile device. The motion sensor can track the movement. A program running on the mobile device or on a vPBX server can generate a signature image based on the tracked movement. After signing the user's name, the user may tap cancel button 760 to cancel the signature, or tap the sign button 780 to enter the signature into the fax document.

If a fax document contains a pre-defined signature area 750, the user's signature in signature box is scaled to the size of the signature area 750 and entered into the signature area 750, upon the user's tapping the sign button 780.

If a fax document does not contain a pre-defined signature area, the mobile device can create an image in the fax document box 740 upon the user's tapping the sign button 780. The user can resize the image, and drag the image to a place in the fax document box 740.

The effect of inserting a signature image into a fax document can differ from inserting non-signature images. Inserting a signature image by tapping a sign button can create a lock on the fax document. The lock can prevent the fax document from further modification. The lock can be stored as part of the document, or separately in a database in a vPBX server, associated with an index to the document. If a fax document signer edits the fax document after signing, the signer is prompted to either discard the editing, or invalidate the signer's prior signature. If a user who is not a signer edits a fax document that has been signed by a first signer, the user's editing of the fax document can be disabled.

After a user's signature is inserted in signature area 750, the user can either cancel the fax document by tapping a cancel button 720, or send the fax document by tapping a send button 730. A fax document template can specify that signature is required for the fax to be sent. If a user is using a "signature required" fax document template, the send button 730 can be disabled until the user signs the fax document. After sending the document, the user cannot further modify the document or invalidate the user's own signature.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment. A computer program can be stored on a computer-readable medium or a storage device.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention. Accordingly, other implementations are within the scope of the following claims.

What is claimed is:

1. A computer-implemented method for transmitting faxes from a mobile device, the method comprising:
   identifying a fax document template;
   providing, by a server, the fax document template for display on a user interface of the mobile device, wherein the mobile device is associated with a virtual private branch exchange (vPBX) user account;
   receiving, at the server and from the mobile device, user input in response to the displayed fax document template;
   generating, by the server, a fax document based on the fax document template and the user input received from the mobile device, wherein zenerating the fax document comprises inserting information associated with the vPBX account into one or more fields in the fax document template, and wherein inserting information associated with the vPBX account comprises:
      determining an extension associated with the vPBX user account, and
      inserting information identifying the extension associated with the vPBX account into a corresponding field in the fax document template;
   receiving a digital signature from the mobile device;
   authenticating the generated fax document with the received digital signature wherein authenticating the generated fax document locks the generated fax document and prevents the generated fax document from being subsequently modified; and
   transmitting, by the server, the authenticated fax document to one or more destinations.

2. The method of claim 1, wherein receiving a digital signature comprises:
   generating a signature image by tracing a finger movement on a touch screen interface of the mobile device; and
   resizing the signature image to a standard signature size.

3. The method of claim 1, wherein receiving a digital signature comprises:

generating a signature image by tracing a waving motion of the mobile device, the waving motion created by a user's hand movement, and traced by a motion sensing device integrated with or coupled to the mobile device; and resizing the signature image to a standard signature size.

4. The method of claim 1, wherein receiving a digital signature comprises:
   authenticating a user, the authentication comprising:
      receiving a user name, a user password, and a user location through a secure communication channel; and
      determining that the user possesses signatorial authority based on a pre-determined combination of user name, user password, and user location; and
   retrieving a pre-stored signature image for the user in response to the authenticating.

5. The method of claim 4, wherein the determining is further based on a pre-determined time window for authentication.

6. The method of claim 1, wherein generating the fax document comprises:
   filling in predetermined portions of the fax document template with the received user input; and
   filling in one or more address fields with a current address of a user, the current address determined by a geographic coordinates of the mobile device and a geographic referencing system.

7. A non-transitory computer-readable medium storing a computer program which, when executed by a computer processor, causes the computer processor to perform operations for transmitting faxes from a mobile device, the operations comprising:
   identifying a fax document template;
   providing, by a server, the fax document template for display on a user interface of the mobile device, wherein the mobile device is associated with virtual private branch exchange (vPBX) user account;
   receiving, at the server and from the mobile device, user input in response to the displayed fax document template;
   generating, by the server, a fax document based on the fax document template and the user input received from the mobile device, wherein generating the fax document comprises inserting information associated with the vPBX account into one or more fields in the fax document template, and wherein inserting information associated with the vPBX account comprises:
      determining an extension associated with the vPBX user account, and
      inserting information identifying the extension associated with the vPBX account into a corresponding field in the fax document template;
   receiving a digital signature from the mobile device;
   authenticating the generated fax document with the received digital signature wherein authenticating the generated fax document locks the generated fax document and prevents the generated fax document from being subsequently modified; and
   transmitting, by the server, the authenticated fax document to one or more destinations.

8. The non-transitory computer-readable medium of claim 7, wherein receiving a digital signature comprises:
   generating a signature image by tracing a finger movement on a touch screen interface of the mobile device; and
   resizing the signature image to a standard signature size.

9. The non-transitory computer-readable medium of claim 7, wherein receiving a digital signature comprises:
   generating a signature image by tracing a waving motion of the mobile device, the waving motion created by a user's hand movement, and traced by a motion sensing device integrated with or coupled to the mobile device; and
   resizing the signature image to a standard signature size.

10. The non-transitory computer-readable medium of claim 7, wherein receiving a digital signature comprises:
    authenticating a user, the authentication comprising:
       receiving a user name, a user password, and a user location through a secure communication channel; and
       determining that the user possesses signatorial authority based on a pre-determined combination of user name, user password, and user location; and
    retrieving a pre-stored signature image for the user in response to the authenticating.

11. The non-transitory computer-readable medium of claim 10, wherein the determining is further based on a pre-determined time window for authentication.

12. The non-transitory computer-readable medium of claim 7, wherein generating the fax document comprises:
    filling in predetermined portions of the fax document template with the received user input; and
    filling in one or more address fields with a current address of a user, the current address determined by a geographic coordinates of the mobile device and a geographic referencing system.

13. A system comprising:
    a server comprising a processor and memory coupled to the processor and operable for storing instructions, which, when executed by the processor, causes the processor to perform operations comprising:
    identifying a fax document template;
    providing, by a server, the fax document template for display on a user interface of the mobile device, wherein the mobile device is associated with virtual private branch exchange (vPBX) user account;
    receiving, at the server and from the mobile device, user input in response to the displayed fax document template;
    generating, by the server, a fax document based on the fax document template and the user input received from the mobile device, wherein generating the fax document comprises inserting information associated with the vPBX account into one or more fields in the fax document template, and wherein inserting information associated with the vPBX account comprises:
       determining an extension associated with the vPBX user account, and
       inserting information identifying the extension associated with the vPBX account into a corresponding field in the fax document template;
    receiving a digital signature from the mobile device;
    authenticating the generated fax document with the received digital signature wherein authenticating the generated fax document locks the generated fax document and prevents the generated fax document from being subsequently modified; and
    transmitting, by the server, the authenticated fax document to one or more destinations.

14. The system of claim 13, wherein receiving a digital signature comprises:
    generating a signature image by tracing a finger movement on a touch screen interface of the mobile device; and
    resizing the signature image to a standard signature size.

15. The system of claim 13, wherein receiving a digital signature comprises:

generating a signature image by tracing a waving motion of the mobile device, the waving motion created by a user's hand movement, and traced by a motion sensing device integrated with or coupled to the mobile device; and resizing the signature image to a standard signature size.

16. The system of claim 13, wherein receiving a digital signature comprises:
   authenticating a user, the authentication comprising:
      receiving a user name, a user password, and a user location through a secure communication channel; and
      determining that the user possesses signatorial authority based on a pre-determined combination of user name, user password, and user location; and
   retrieving a pre-stored signature image for the user in response to the authenticating.

17. The system of claim 16, wherein the determining is further based on a pre-determined time window for authentication.

18. The system of claim 13, wherein generating the fax document comprises:
   filling in predetermined portions of the fax document template with the received user input; and
   filling in one or more address fields with a current address of a user, the current address determined by a geographic coordinates of the mobile device and a geographic referencing system.

19. A method comprising:
   identifying a fax document template, the fax document template containing predefined configuration data for configuring transmission of a fax document;
   providing, by a server, the fax document template for display on a user interface of a mobile device, wherein the mobile device is associated with a virtual private branch exchange (vPBX) user account;
   receiving, at the server and from the mobile device, user input data from the mobile device based on the displayed fax document template;
   receiving signature data associated with the user input data;
   generating, by the server, the fax document based on the user input data received from the mobile device and the signature data including locking the generated fax document using the signature data to prevent the generated fax document from being subsequently modified, wherein generating the fax document comprises inserting information associated with the vPBX account into one or more fields in the fax document template, and wherein inserting information associated with the vPBX account comprises:
      determining an extension associated with the vPBX user account, and
      inserting information identifying the extension associated with the vPBX account into a corresponding field in the fax document template; and
   transmitting, by the server, the fax document to one or more recipients identified through the user interface of the mobile device.

20. The method of claim 19, wherein:
   receiving signature data includes retrieving a pre-stored digital signature from a database, the pre-stored digital signature being generated and stored in the database prior to receiving the user input data, and
   generating the fax document includes inserting the pre-stored digital signature into the fax document.

21. The method of claim 20, further comprising authenticating a user of the mobile device, where retrieving the pre-stored digital signature from the database is performed after authenticating the user of the mobile device.

22. The method of claim 19, wherein:
   receiving signature data includes receiving a digital signature from a user of the mobile device through the user interface.

23. The method of claim 22, further comprising comparing the digital signature with a pre-stored digital signature,
   where generating the fax document includes inserting the digital signature into the fax document when the digital signature matches the pre-stored digital signature.

* * * * *

UNITED STATES PATENT AND TRADEMARK OFFICE
CERTIFICATE OF CORRECTION

| | | |
|---|---|---|
| PATENT NO. | : 8,780,383 B2 | Page 1 of 1 |
| APPLICATION NO. | : 12/469573 | |
| DATED | : July 15, 2014 | |
| INVENTOR(S) | : Vlad Vendrow et al. | |

It is certified that error appears in the above-identified patent and that said Letters Patent is hereby corrected as shown below:

In the Claims

Column 16, line 43, Claim 1: delete "zenerating" and insert --generating--.

Signed and Sealed this
Fourth Day of November, 2014

Michelle K. Lee
*Deputy Director of the United States Patent and Trademark Office*

UNITED STATES PATENT AND TRADEMARK OFFICE
CERTIFICATE OF CORRECTION

| | |
|---|---|
| PATENT NO. | : 8,780,383 B2 |
| APPLICATION NO. | : 12/469573 |
| DATED | : July 15, 2014 |
| INVENTOR(S) | : Vendrow et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1090 days.

Signed and Sealed this
Fifteenth Day of March, 2016

Michelle K. Lee
*Director of the United States Patent and Trademark Office*